United States Patent
Matsuoka

(10) Patent No.: US 7,486,222 B2
(45) Date of Patent: Feb. 3, 2009

(54) AUTOMOTIVE RADAR DEVICE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 158 days.

(21) Appl. No.: 11/399,378

(22) Filed: Apr. 7, 2006

(65) Prior Publication Data

US 2007/0085728 A1    Apr. 19, 2007

(30) Foreign Application Priority Data

Oct. 14, 2005   (JP) .......................... P2005-299587

(51) Int. Cl.
- G01S 13/93  (2006.01)
- G01S 13/88  (2006.01)
- G01S 7/40   (2006.01)
- H01Q 1/42   (2006.01)

(52) U.S. Cl. .................. 342/70; 342/165; 342/173; 343/872

(58) Field of Classification Search ............. 342/5–12, 342/70–72, 173, 159, 165, 175; 343/872
See application file for complete search history.

(56) References Cited

U.S. PATENT DOCUMENTS

| | | | |
|---|---|---|---|
| 6,469,659 B1 * | 10/2002 | Lajiness et al. ............. | 342/173 |
| 6,611,227 B1 * | 8/2003 | Nebiyeloul-Kifle et al. . | 342/173 |
| 6,954,172 B2 * | 10/2005 | Hofmann et al. ............ | 342/173 |
| 2005/0200833 A1 | 9/2005 | Nakamura et al. | |

FOREIGN PATENT DOCUMENTS

| | | |
|---|---|---|
| JP | 8-316729 A | 11/1996 |
| JP | 9-211108 | 8/1997 |

(Continued)

OTHER PUBLICATIONS

"Radar Antennas" p.1, Cui, Tie Jun et al., Wiley Encyclopedia of Electrical and Electronics Enginnering, DOI: 10.1002/047134608X. W1229 Article Online Posting Date: Dec. 27, 1999.*

(Continued)

*Primary Examiner*—Thomas H Tarcza
*Assistant Examiner*—Cassi Galt
(74) *Attorney, Agent, or Firm*—Sughrue Mion, PLLC

(57) ABSTRACT

An automotive radar device that can securely detect dirt adhering to the surface of a vehicle-side radome irrespective of the positional relation between the vehicle-side radome and a radar. The automotive radar device has a radio-type radar housed in a vehicle-side radome installed on a vehicle, the radio-type radar including a transmitting unit and a receiving unit. The automotive radar device sends and receives radio waves from the radar through the vehicle-side radome and measures distance and relative velocity with respect to a subject. The automotive radar device includes a guiding unit that is arranged between the vehicle-side radome and the radar and that guides a reflected wave from adhering matter on a surface of the vehicle-side radome to the receiving unit of the radar, and an adhering matter judging unit that judges the existence/non-existence of the adhering matter on the surface of the vehicle-side radome on the basis of signal level of the reflected wave received by the receiving unit.

19 Claims, 17 Drawing Sheets

FOREIGN PATENT DOCUMENTS

| | | |
|---|---|---|
| JP | 10-282229 | 10/1998 |
| JP | 2001-013238 A | 1/2001 |
| JP | 2001-284957 A | 10/2001 |
| JP | 2002-286839 A | 10/2002 |
| JP | 2003-1565560 A | 5/2003 |
| JP | 2003-207561 A | 7/2003 |
| JP | 2004-125559 A | 4/2004 |

OTHER PUBLICATIONS

"Dielectric-Loaded Antennas" p. 279-281, Shafai, L., Wiley Encyclopedia of Electrical and Electronics Engineering, DOI: 10.1002/047134608X.W1215 Article Online Posting Date: Dec. 27, 1999.*

Translation of JP 2003-207561 to Hachitsuka, Hiroyuki et al.*

* cited by examiner (a) FOR RELATIVE VELOCITY = 0

(b) FOR RELATIVE VELOCITY ≠ 0

FOR REFLECTION FROM VERY SHORT DISTANCE (RELATIVE VELOCITY = 0)

(a) WHEN THERE IS NO DIRT (b) WHEN THERE IS DIRT

AUTOMOTIVE RADAR DEVICE

BACKGROUND OF THE INVENTION

1. Field of the Invention

This invention relates to a automotive radar device and particularly to a automotive radar device that can detect dirt adhering to the surface of a vehicle-side radome on the basis of the signal level of a reflected wave.

2. Description of the Related Art

As a conventional technique of determining dirt adhering to the surface of a vehicle-side radome installed on a vehicle on the basis of the signal level of a reflected wave from the surface of the vehicle-side radome, a process of extracting a low-frequency component of a beat signal by a low-pass filter, A/D-converting the extracted low-frequency component by an A/D converter, performing fast Fourier transform thereto by a fast Fourier transformer, comparing stored frequency spectrum data of a low-frequency component in a state where no dirt is adhering to the radome with frequency spectrum data of an inputted low-frequency component, and detecting that dirt is adhering to the surface of the vehicle-side radome, is performed in a frequency-modulation radar (FM radar) device, as disclosed in Patent Reference 1.

Patent Reference 1: JP-A-10-282229

Generally, a radio-type radar has an advantage that it can be installed in a vehicle-side radome and does not spoil the vehicle design because of the characteristic of its medium, compared with an optical radar.

Therefore, in many cases, a vehicle-side radome is arranged obliquely in front of a radar so as not to spoil the vehicle design. In such cases, a reflected wave from dirt including snow adhering to the surface of the vehicle-side radome is reflected with its reflection angle being equal to its incident angle. Therefore, depending on the angle of the vehicle-side radome, the reflected wave cannot be received and the adhering matter may not be detected.

As reflected components from a very short distance other than the reflection from the adhering matter on the radar radome or the vehicle-side radome, there are leakage between a transmitter and a receiver within a high-frequency circuit, leakage between a transmitting antenna and a receiving antenna and the like. Since the level of these components is decided in accordance with the relation between the phases of transmission wave components (LO waves) to be mixed, the level varies depending on the difference between individual devices and the temperature.

Although there is a technique of, for example, providing a map of judgment reference values in consideration of temperature characteristics, it requires adjustment for each case, leading to increase in the adjustment cost.

Alternatively, there is a technique of constantly learning the level of reflected components from a very short distance and judging the existence/non-existence of adhering matter on the basis of the quantity of change from the learned value.

However, for example, in a case where dirt adheres to the surface of the vehicle-side radome while it is parked at night and then the engine is started the next morning, the learning is started in a state where dirt is already on the surface. Therefore, the quantity of change cannot be detected and the existence of the adhering matter cannot be judged.

SUMMARY OF THE INVENTION

In view of the foregoing status of the art, it is an object of this invention to provide an automotive radar device that can securely detect dirt adhering to the surface of the vehicle-side radome, irrespective of the positional relation between the vehicle-side radome and the radar.

An automotive radar device according to this invention has a radio-type radar housed in a vehicle-side radome installed on a vehicle, the radar-type radar including a transmitting unit and a receiving unit. The automotive radar device sends and receives radio waves from the radar through the vehicle-side radome and measures distance and relative velocity with respect to a subject. The automotive radar device includes: a guiding unit that is arranged between the vehicle-side radome and the radar and that guides a reflected wave from adhering matter on a surface of the vehicle-side radome to the receiving unit of the radar; and an adhering matter judging unit that judges the existence/non-existence of the adhering matter on the surface of the vehicle-side radome on the basis of the signal level of the reflected wave received by the receiving unit.

With the automotive radar device according to this invention, dirt adhering to the surface of the vehicle-side radome can be securely detected even in the case where the vehicle-side radome is obliquely installed.

DETAILED DESCRIPTION OF THE PREFERRED EMBODIMENTS

Embodiment 1

Figure 1A:
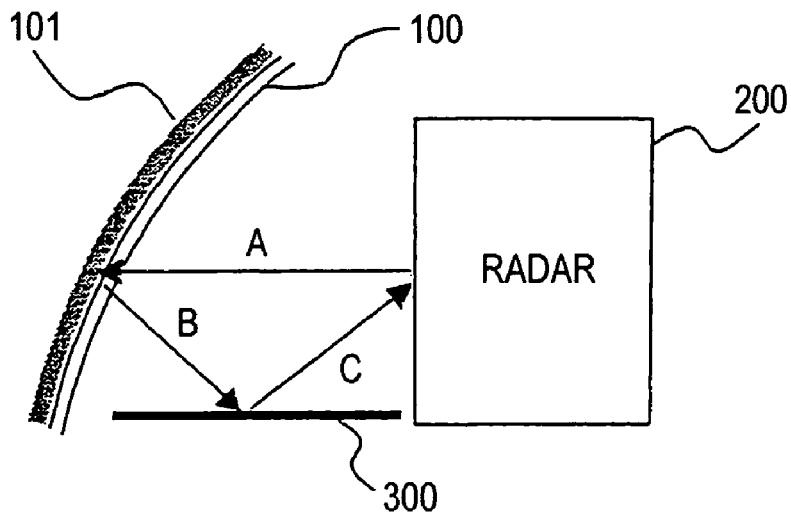
FIGS. 1A to 1C are schematic structural views showing a automotive radar device according to Embodiment 1 of this invention.

A automotive radar device according to Embodiment 1 includes a vehicle-side radome 100 installed on a vehicle, a radio-type radar 200 that is housed within the vehicle-side radome 100 and that sends and receives radio waves through the vehicle-side radome and measures the distance and relative velocity with respect to a subject, and a reflection board 300 as a guiding unit that is arranged between the vehicle-side radome 100 and the radar 200 and that guides a reflected wave from adhering matter on the surface of the vehicle-side radome to a receiving unit of the radar, as shown in FIG. 1A. In FIG. 1A, A represents the path of a transmission wave from the radar 200, B represents the path of a reflected wave from dirt adhering to the surface of the vehicle-side radome 100, and C represents the path of a reflected wave from the reflection board 300 to the radar 200.

Figure 1B:
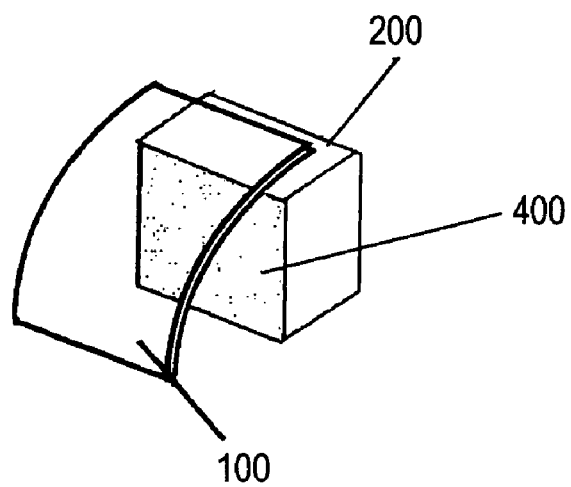
Figure 1C:
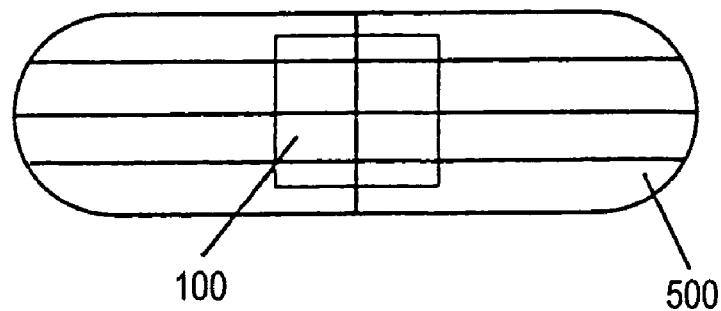

The vehicle-side radome 100 is installed in a space formed by cutting out a part of a vehicle-side front grille 500 so that the vehicle-side radome 100 is situated in front of a radar radome 400, which also serves as a front casing of the radar 200 (see FIGS. 1B and 1C).

Figure 2:
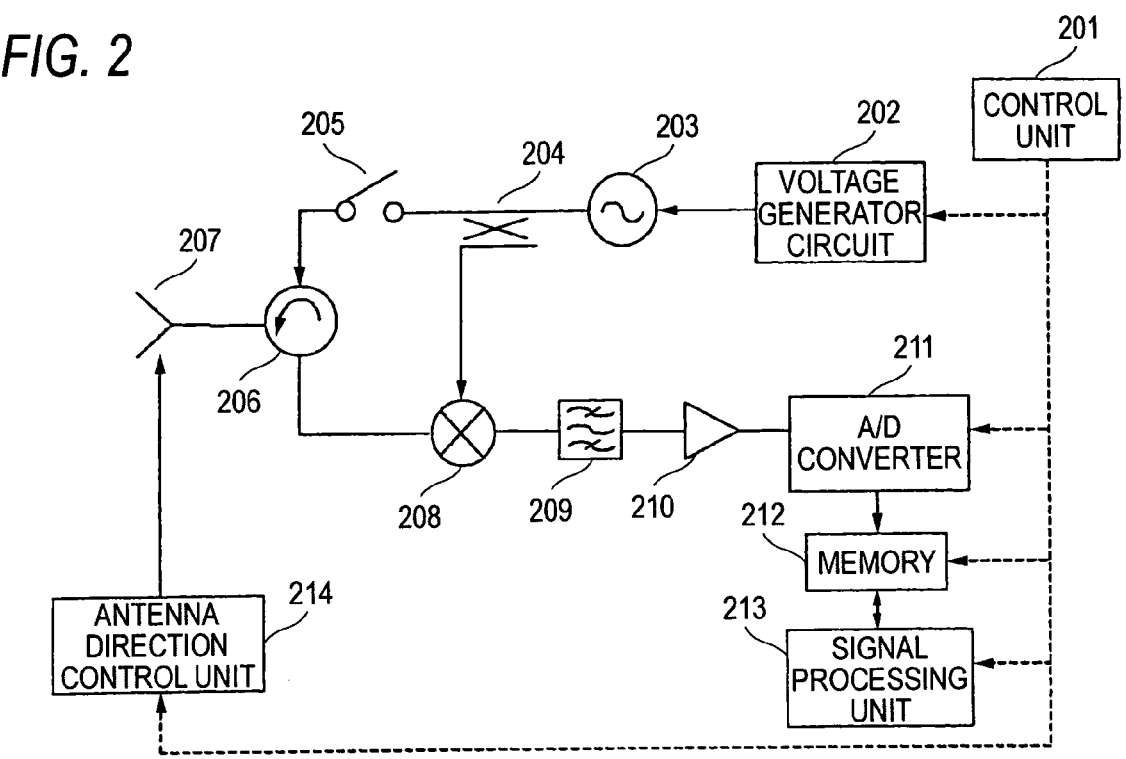
FIG. 2 is a block diagram showing a construction of a radar according to Embodiment 1.

The radio-type radar 200 includes a control unit 201, a voltage generator circuit 202 that generates a signal for modulation, a voltage-controlled oscillator (VCO) 203, a distributor 204, a transmission switch 205, a circulator 206, a transmission/reception shared antenna 207, a mixer 208, a band-pass filter (BPF) 209, an amplifier 210, an A/D converter 211, a memory 212, a signal processing unit 213, and an antenna direction control unit 214, as shown in FIG. 2.

First, the transmission operation will be described (see FIGS. 3A to 3C).

Figure 3:
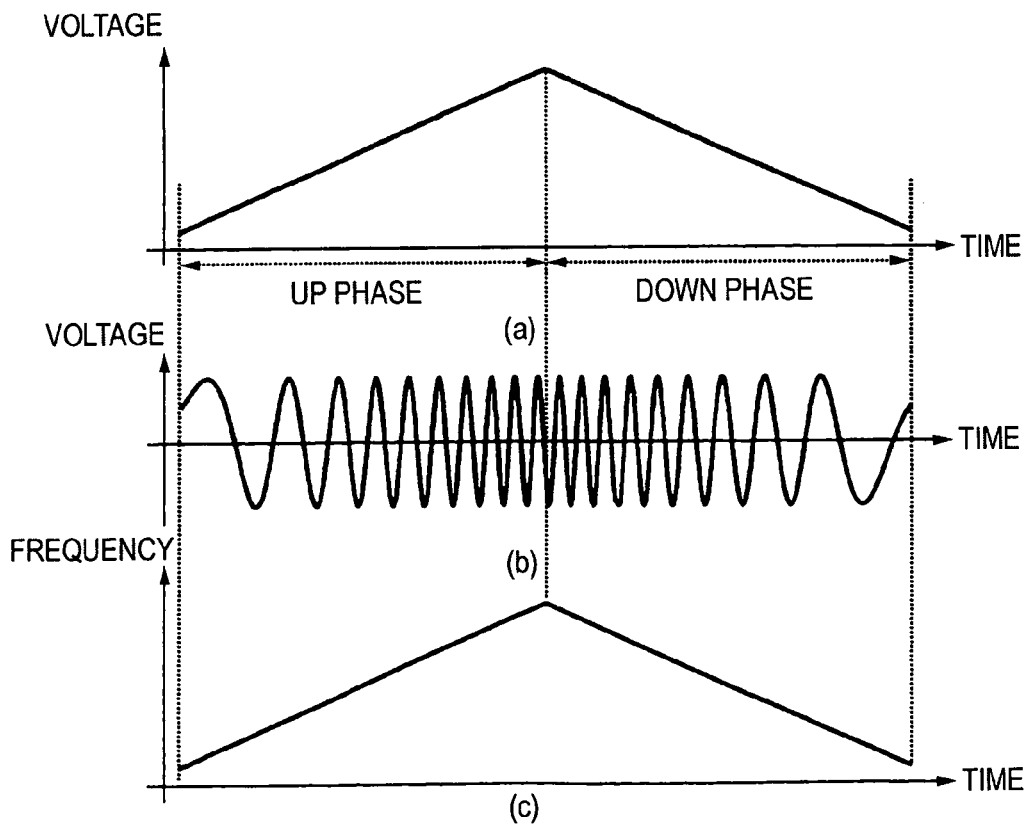
FIGS. 3A to 3C are views for explaining a transmission operation by the radar according to Embodiment 1.

The voltage generator circuit 202 with its timing and the like controlled by the control unit 201 generates a voltage of FIG. 3A that changes in the form of triangle wave with the lapse of time, and applies the voltage to the voltage-controlled oscillator 203. In accordance with the applied voltage, the voltage-controlled oscillator 203 generates a frequency-modulation continuous wave (FMCW) with its frequency changing with the lapse of time, and outputs the frequency modulation continuous wave to the distributor 204. Of this FMCW, the voltage change with the lapse of time is shown in FIG. 3B and the frequency change with the lapse of time is shown in FIG. 3C. The distributor 204 outputs a part of the inputted FMCW as a transmission signal to the transmission switch 205 and outputs the remaining part as a local signal to the mixer 208. The transmission switch 205 performs pulse modulation of the inputted part of the FMCW and outputs it to the transmission/reception shared antenna 207 via the circulator 206. The transmission/reception shared antenna 207 emits the inputted transmission signal as a transmission wave to the space through the vehicle-side radome 100.

Next, the receiving operation will be described (see FIG. 4).

Figure 4:
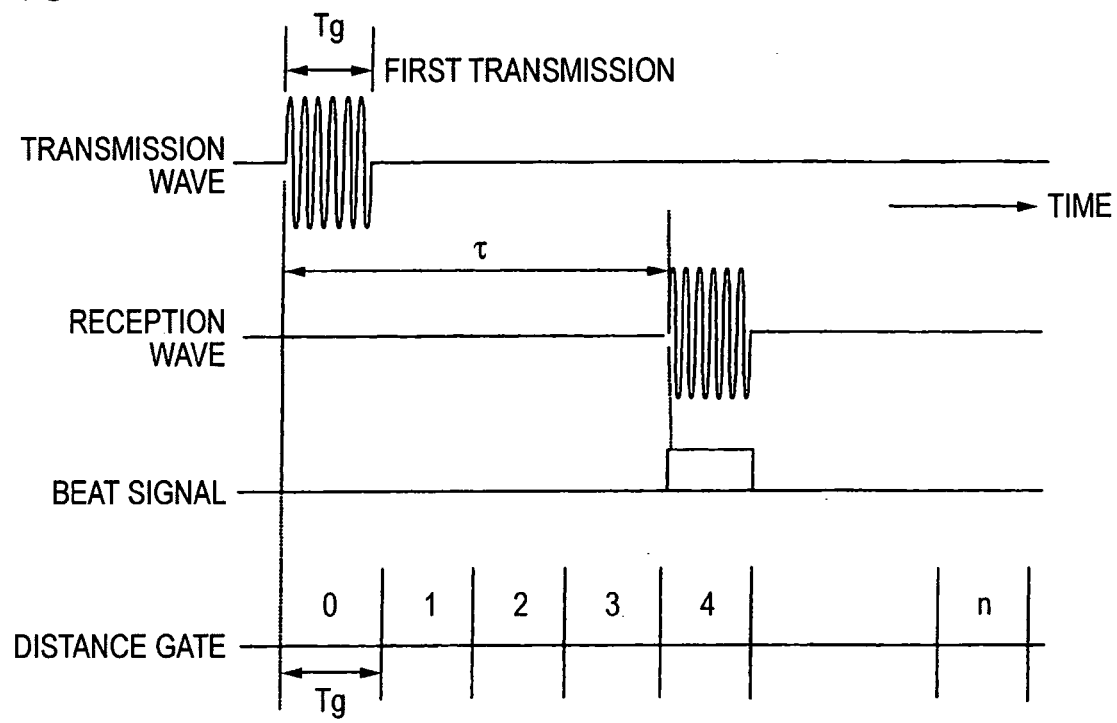
FIG. 4 is a view for explaining a receiving operation by the radar according to Embodiment 1.

The radio wave emitted from the transmission/reception shared antenna 207 becomes a pulse wave that is outputted only in a period of Tg as shown in FIG. 4 and is inputted to the transmission/reception shared antenna 207 through the vehicle-side radome 100 with a delay time τ corresponding to the distance R to a subject. After that, the pulse wave is mixed with the FMCW from the voltage-controlled oscillator 203 by the mixer 208, thus outputting a beat signal. The resulting beat signal passes through the band-pass filter 209 and is then amplified by the amplifier 210. The amplified signal is inputted to the A/D converter 211 for each distance gate and then converted to a digital signal, which is outputted to the memory 212. As the observation periods for up phase (modulation period when the frequency increases with the lapse of time) and down phase (modulation period when the frequency decreases with the lapse of time) are ended by the control unit 201, the memory 212 enables reading of the recorded A/D value.

The signal processing unit 213 is formed by, for example, a central processing unit (CPU) or a combination of CPU and a digital signal processor (DSP). At the time when the observation period for up phase or down phase is ended by the control unit 201, the signal processing unit 213 inputs the A/D value of the beat signal in up phase or the A/D value of the beat signal in down phase, then calculates target distance, velocity and azimuth angle, and outputs the result of the calculation to other devices (such as an operation control device and display device of the vehicle) (normal measurement mode).

Figure 5:
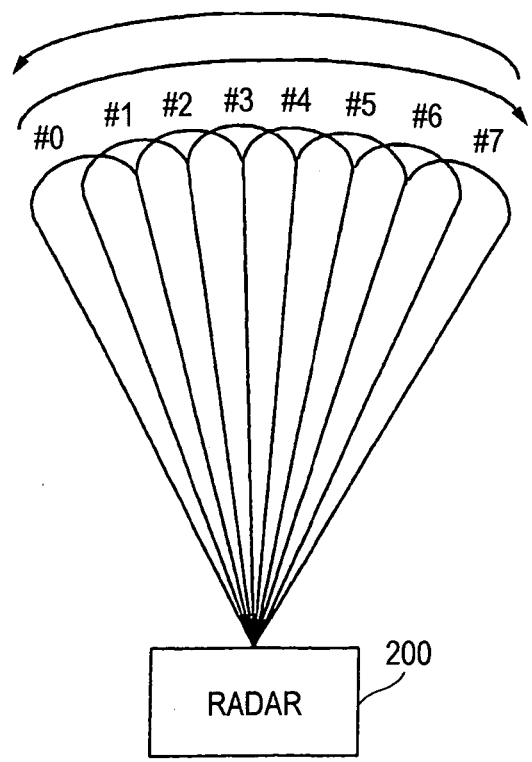
FIG. 5 is a view for explaining antenna direction control of the radar according to Embodiment 1.

The above-described operation is performed while the antenna direction control unit 214 changes the direction of the transmission/reception shared antenna 207 under the control of the control unit 201, that is, while the direction of the radio wave beam emitted from the transmission/reception shared antenna 207 of the radar 200 changes (for example, in eight directions) as shown in FIG. 5.

In this embodiment, the signal is transmitted while the direction of the radio wave beam is changed. However, plural beams may be simultaneously transmitted or switched by a switch.

Next, a dirt detection method for the vehicle-side radome 100 will be described.

As shown in FIG. 1A, when dirt 101 adheres to the vehicle-side radome 100, a reflected wave from the surface with the dirt is reflected by the reflection board 300 arranged between the vehicle-side radome 100 and the radar 200 and inputted to the transmission/reception shared antenna 207 of the radar 200.

On the other hand, when no dirt adheres to the vehicle-side radome 100, a transmission wave is emitted, passing through the vehicle-side radome 100, and there is little reflection from the vehicle-side radome 100.

Figure 6:
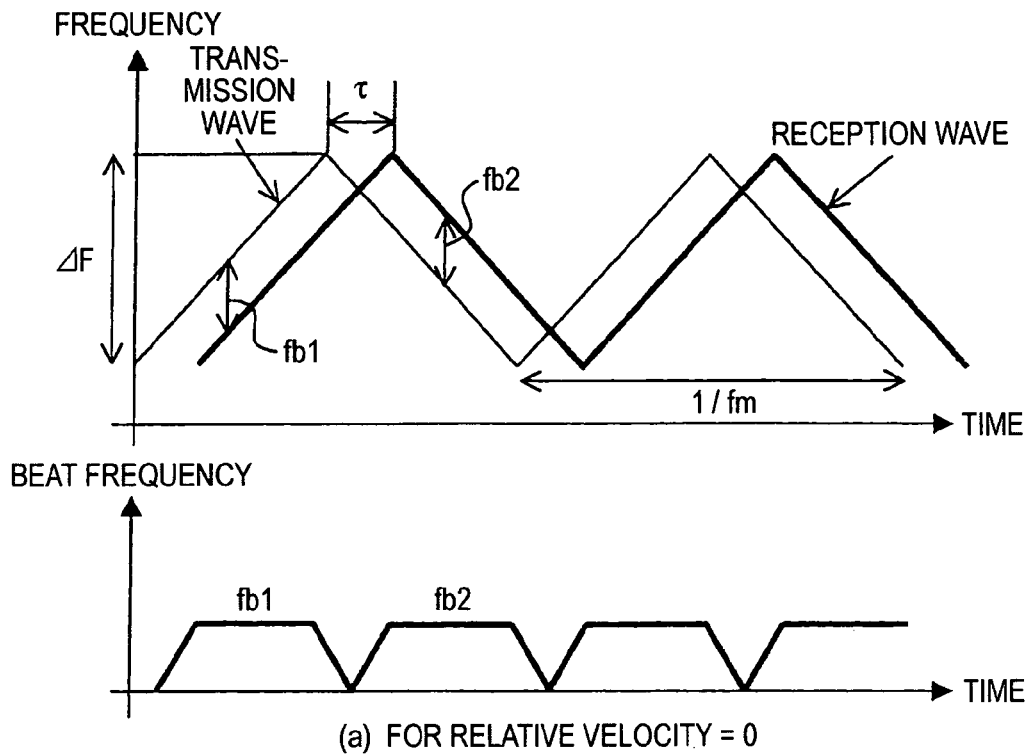
FIGS. 6A and 6B are views for explaining an operation of a frequency-modulation radar according to Embodiment 1.
Figure 6:
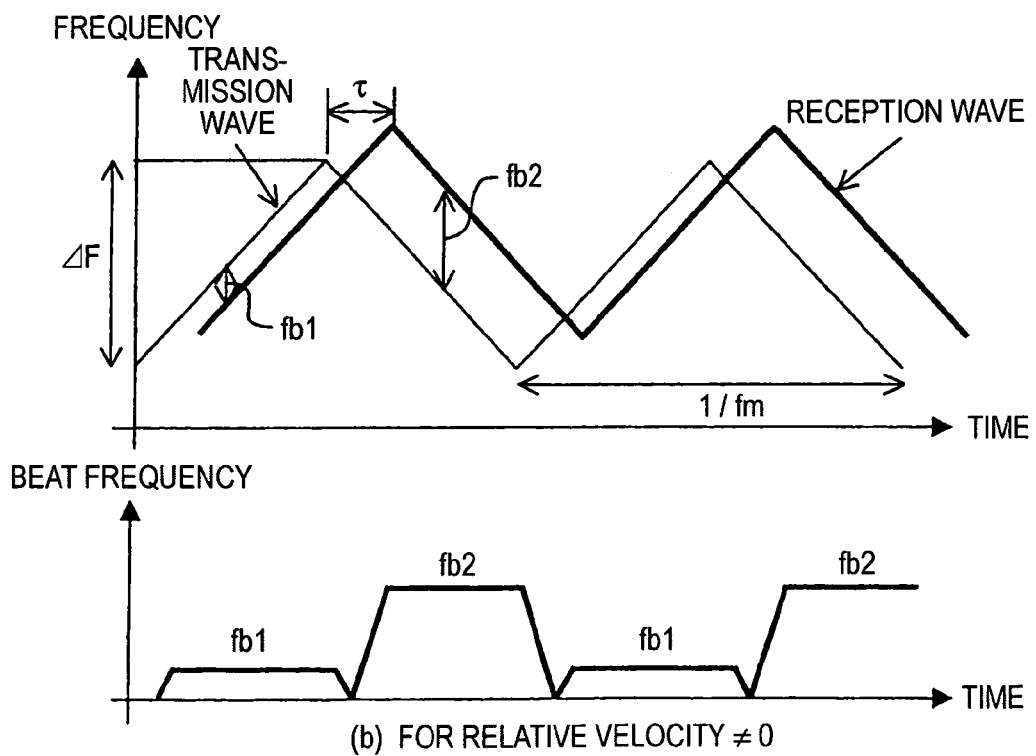
Figure 7:
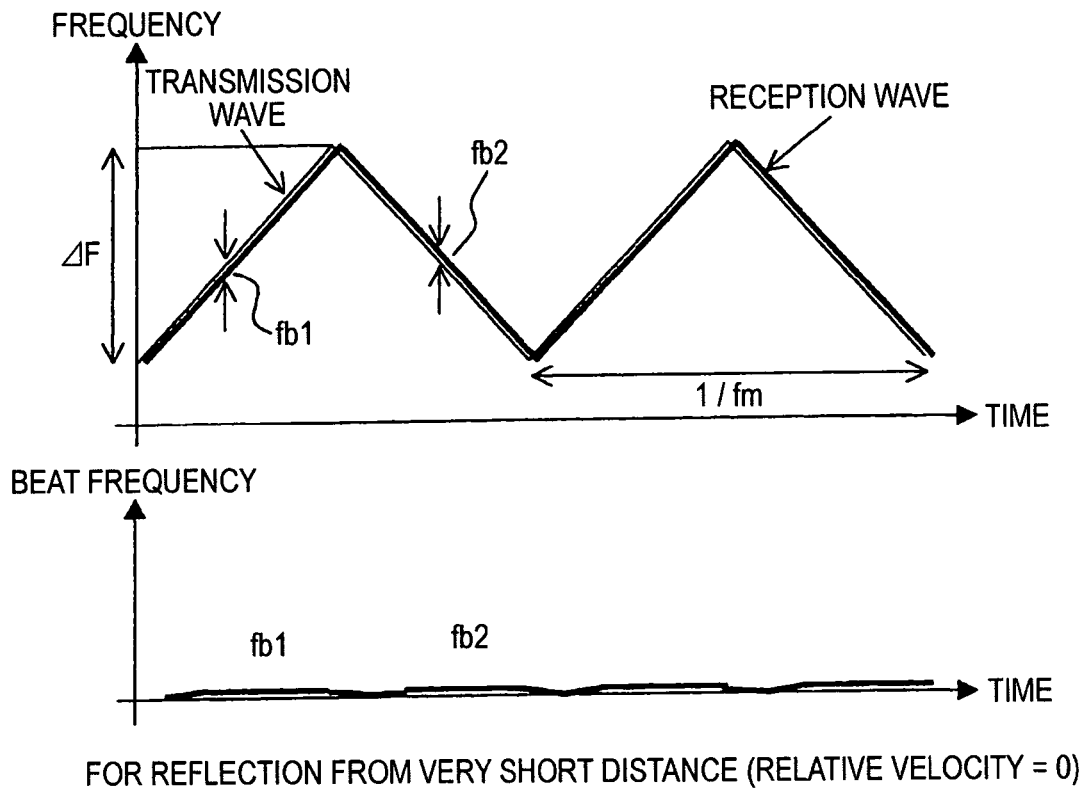
FIG. 7 is a view for explaining an operation of the frequency-modulation radar according to Embodiment 1.

FIGS. 6A and 6B and FIG. 7 are timing charts showing the relation between the frequency of a transmission/reception wave in a frequency-modulation radar and the frequency of a beat signal, at different relative velocities.

Generally, in the case of a frequency-modulation radar, a reception wave and a transmission wave component (LO wave) are mixed and the frequency difference components are generated as beat signals fb1, fb2, as shown in FIGS. 6A and 6B and FIG. 7.

Since the reflected wave from the dirt 101 adhering to the vehicle-side radome 100 is received in a very short time after it is transmitted, the reception wave has a frequency substantially equal to the modulation frequency of the transmission wave, as shown in FIG. 7.

Therefore, as beat signals fb1, fb2, signals substantially of the DC components alone, which are decided by the intensity of the reflected wave and the phase relation with the transmission wave component (LO wave) to be mixed, are generated.

Figure 8:
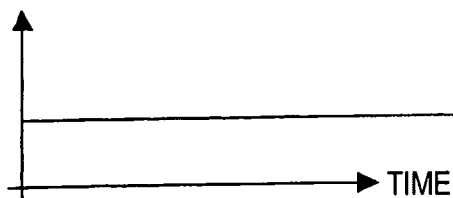
FIGS. 8A and 8B are view for explaining a dirt detection method according to Embodiment 1.
Figure 8:
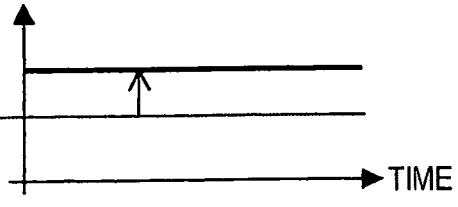

Thus, as shown in FIGS. 8A and 8B, when a distance gate equivalent to a very short distance is considered, the A/D value in the absence of dirt and the A/D value in the presence of dirt are different in the level of the DC component because of the reflection from thee dirt itself. Therefore, the adherence of dirt can be judged by detecting the difference in the level.

Figure 9:
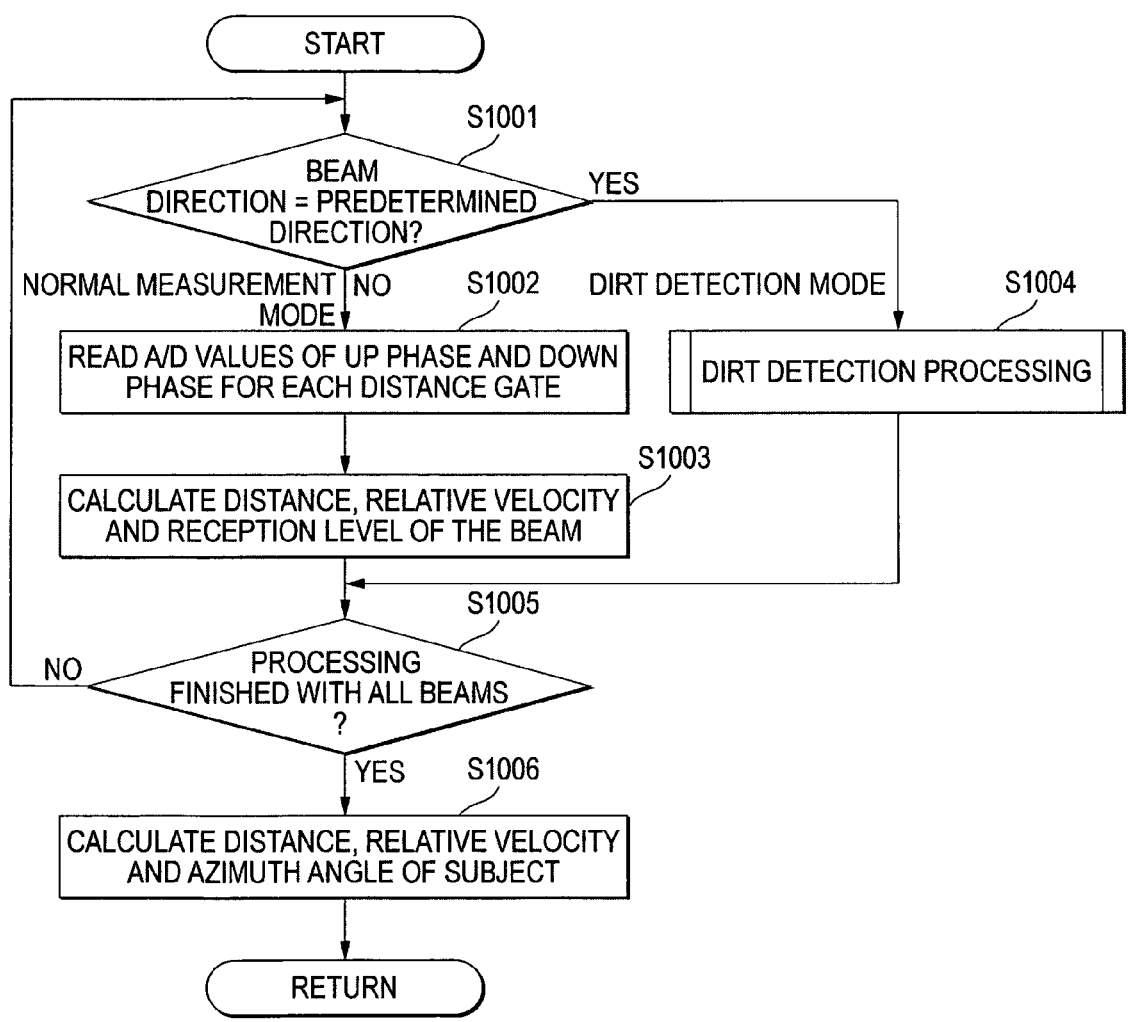
FIG. 9 is a flowchart of signal processing according to Embodiment 1.

Next, signal processing performed by the signal processing unit 213 of the radar 200 is shown in the flowchart of FIG. 9.

Each step will now be described.

S1001: It is judged whether the control beam direction is a predetermined direction or not. If it is not the predetermined beam direction, the processing shifts to S1002. If it is the predetermined beam direction, the processing shifts to S1004.

S1002: The A/D values of up phase and down phase are read for each distance gate (normal measurement mode).

S1003: The distance, relative velocity and reception level of the beam are calculated on the basis of the read A/D values.

S1004: Dirt detection processing is executed (dirt detection mode).

S1005: It is judged whether the processing is finished with all the beams or not. If it is finished, the processing shifts to S1006. If not, the processing goes back to S1001.

S1006: The distance, relative velocity and azimuth angle of a subject are calculated from the distance, relative velocity and reception level of each beam.

Figure 10:
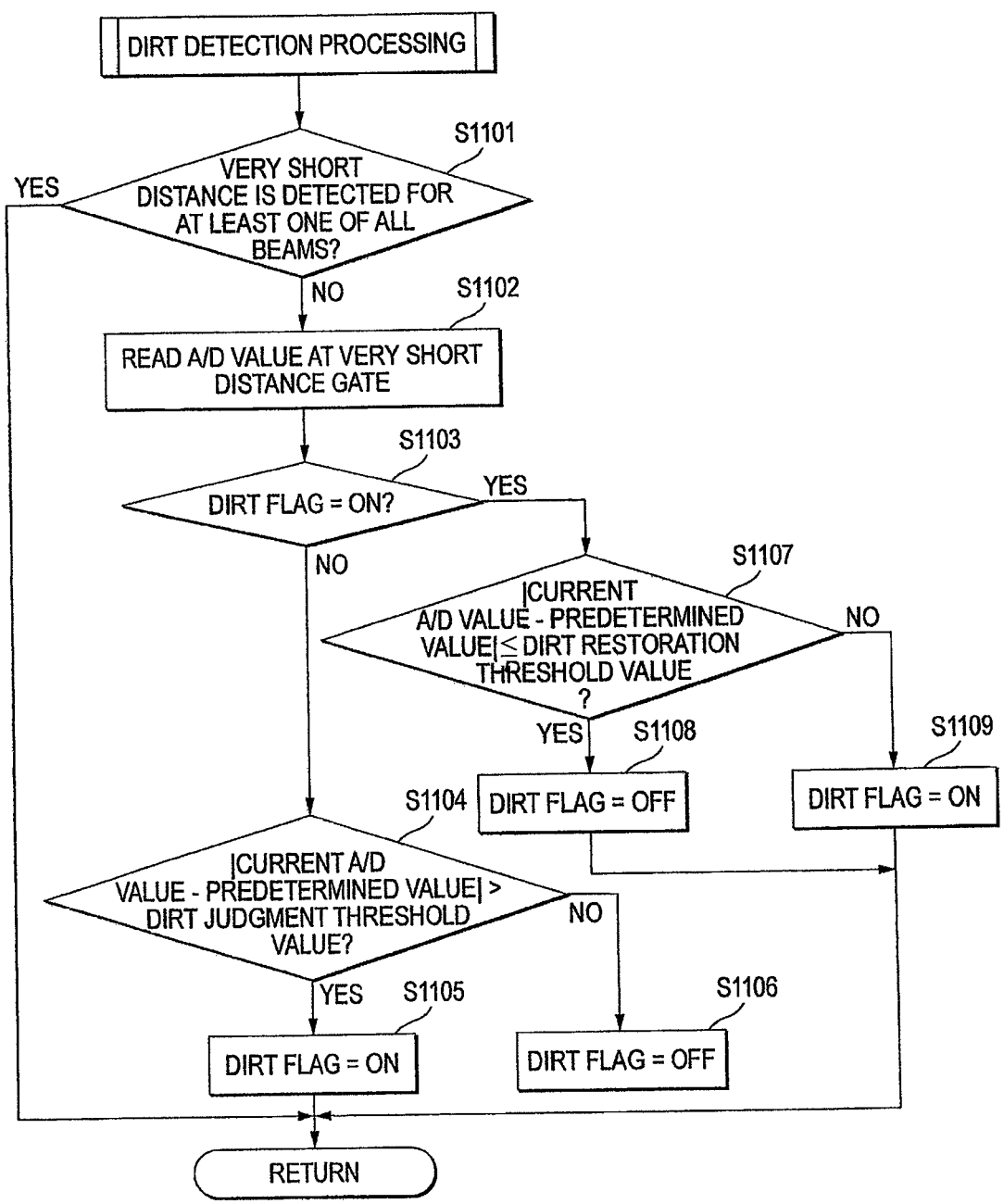
FIG. 10 is a flowchart of dirt detection processing according to Embodiment 1.

Next, the flowchart of the dirt detection mode shown in FIG. 10 will be described. This dirt detection mode functions as an adhering matter judging unit that judges the existence/non-existence of adhering matter on the surface of the vehicle-side radome on the basis of the signal level of the reflected wave.

Each step will now be described.

S1101: It is checked whether a very short distance (for example, 10 m or less) is detected, with respect to all the beams. If the very short distance is detected for at least one beam, the processing ends. If the very short distance is detected for none of the beams, the processing shifts to S1102.

If an object is actually detected at the very short distance, the A/D value of the very short distance gate changes depending on the relative velocity and misjudgment of dirt may occur. Therefore, in the very short distance detection state, dirt judgment is not performed.

S1102: The A/D value at the very short distance gate (for example, minimum distance gate) is read.

S1103: If a dirt flag is ON, the processing shifts to S1007. If it is OFF, the processing shifts to S1104.

S1104: The absolute value X of the difference between the currently inputted A/D value and a predetermined value is calculated and compared with a preset dirt judgment threshold value. If X is larger than the dirt judgment threshold value, the processing shifts to S1105. Otherwise, the processing shifts to S1106.

S1105: The dirt flag is turned ON.

S1106: The dirt flag is turned OFF.

S1107: The absolute value X of the difference between the currently inputted A/D value and a predetermined value is calculated and compared with a preset dirt restoration threshold value. If X is equal to or less than the dirt restoration threshold value, the processing shifts to S1108. Otherwise, the processing shifts to S1109.

S1108: The dirt flag is turned OFF.

S1109: The dirt flag is turned ON.

In this manner, according to Embodiment 1, since the reflection board 300 is arranged as a guiding unit between the vehicle radome 100 and the radar 200 so that the reflected wave from the dirt 101 adhering to the surface of the vehicle-side radome 100 can be received by the receiving antenna 207 of the radar 200, the dirt 101 adhering to the surface of the vehicle-side radome can be securely detected even when the vehicle-side radome 100 is obliquely installed.

The result of an exemplary test with respect to Embodiment 1 is described here. If the difference between the A/D value and a predetermined value is 10 to 20 when the dirt 101 does not exist on the surface of the vehicle-side radome 100, the difference between the A/D value and the predetermined value is 50 to 100 when the dirt (water film) 101 exists and the reflection board 300 is not provided, whereas the difference between the A/D value and the predetermined value is 200 to 300 when the dirt (water film) 101 exists and the reflection board 300 is provided. Thus, when the reflection board 300 is provided, the differential value is three to four times the differential value in the case where the reflection board 300 is not provided.

Also, by providing a preset threshold value for judgment of dirt adherence, misjudgment due to level changes (caused by noise or the like) in the case where there is no dirt adherence can be prevented.

Moreover, since the reflection board 300 as a guiding unit is provided in order to affect only a specific beam direction, the specific direction can be set, for example, to be the direction at the edge of the beam casting range, thus causing no influence on the normal measurement mode.

In Embodiment 1, the FM pulse system is used as an exemplary radar system. However, in other radar systems, too, the similar effect can be achieved by using the reflection level from a very short distance.

Figure 21:
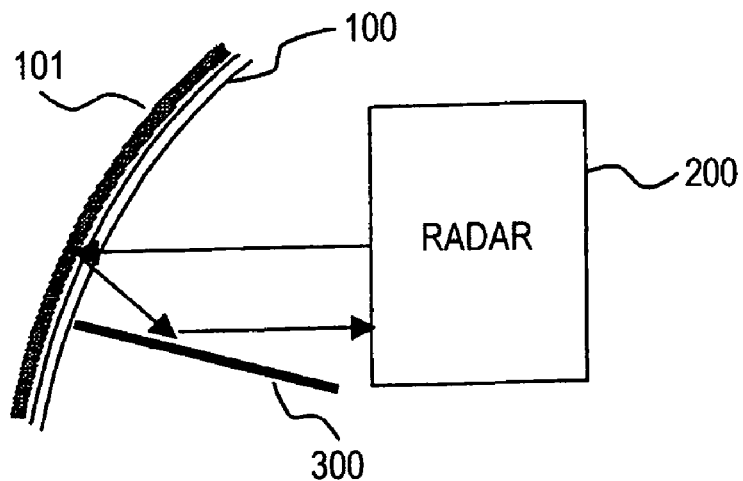
FIG. 21 is an explanatory view showing an example with a different guiding unit according to Embodiment 1.

The reflection board 300 may be installed to reflect the reflected wave from the dirt 101 adhering to the surface of the vehicle-side radome into the direction of the receiving antenna, parallel to the directivity direction of the receiving antenna of the radar 200, as shown in FIG. 21.

In this case, since the directivity of the receiving antenna is considered, the reflected wave from the dirt 101 can be received efficiently.

In Embodiment 1, the reflection board 300 is used so that the reflected wave from the dirt 101 adhering to the surface of the vehicle-side radome can be received by the receiving antenna. However, a guiding unit of any form can be used as long as it similarly guides the reflected wave from the dirt adhering to the vehicle-side radome so that the reflected wave can be received by the receiving antenna.

Figure 22:
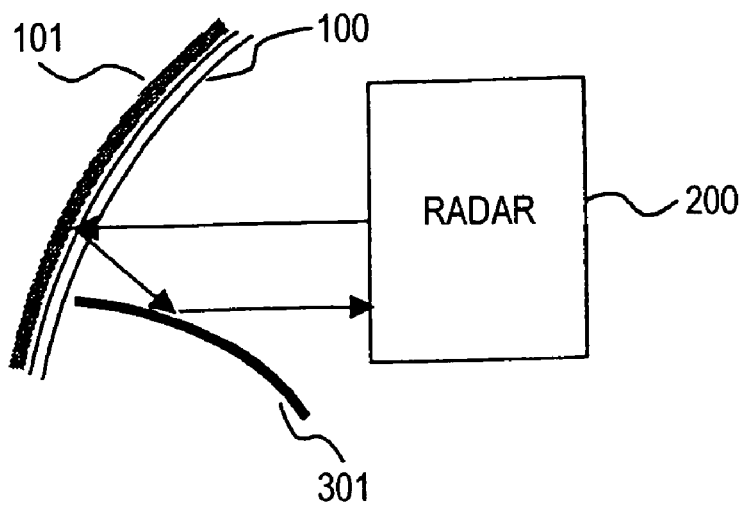
FIG. 22 is an explanatory view showing an example with a different guiding unit according to Embodiment 1.

For example, a reflecting mirror 301 (FIG. 1A) may be used as a guiding unit that enables the reflected wave from the dirt 101 adhering to the surface of the vehicle-side radome to be received by the receiving antenna, as shown in FIG. 22.

Figure 23:
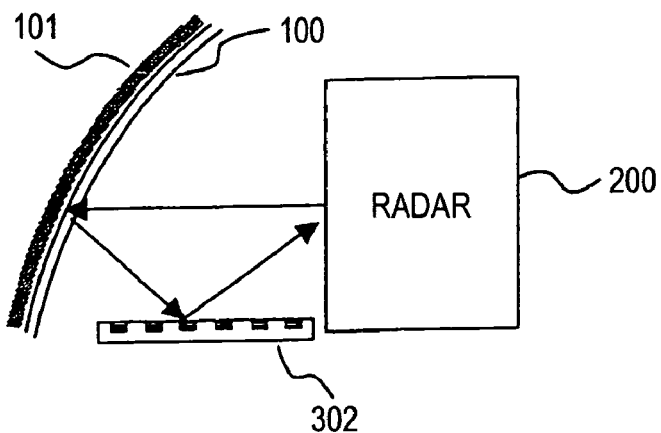
FIG. 23 is an explanatory view showing an example with a different guiding unit according to Embodiment 1.

Also, a flat array antenna 302 with total reflection at its feeding point may be used, for example, as shown in FIG. 23.

As total reflection is made at the feeding point and the phase of each element is adjusted in advance to reflect the reflected wave from the dirt 101 adhering to the surface of the vehicle-side radome into the direction of the receiving antenna, the reflected wave can be received by the receiving antenna.

This enables provision of a thinner guiding unit, and increase in the degree of freedom and easiness in the arrangement.

Moreover, this can prevent shielding over the front part of the radar 200.

If the feeding point of the flat array antenna 302 is constructed to be switched between total reflection and terminal (for example, 50Ω) by a switch, it is possible in transmitting plural beams to perform total reflection only when transmitting a specific beam. Thus, it is possible to receive the reflected wave from the dirt 101 adhering to the surface of the vehicle-side radome, with respect to only the specific beam direction.

Figure 24:
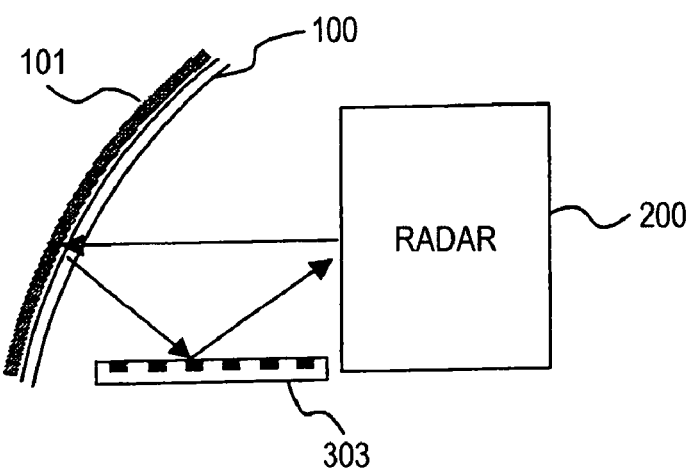
FIG. 24 is an explanatory view showing an example with a different guiding unit according to Embodiment 1.

Also, for example, a reflector array 303 may be used as a guiding unit that enables the reflected wave from the dirt 101 adhering to the surface of the vehicle-side radome to be received by the receiving antenna, as shown in FIG. 24.

The reflector array 303 has metal elements arranged on its flat surface and thus can reflect an incoming radio wave to a desired direction by changing the size and form of each element.

This enables provision of a thinner guiding unit, and increase in the degree of freedom and easiness in the arrangement.

Moreover, this can prevent shielding over the front part of the radar 200.

Figure 25:
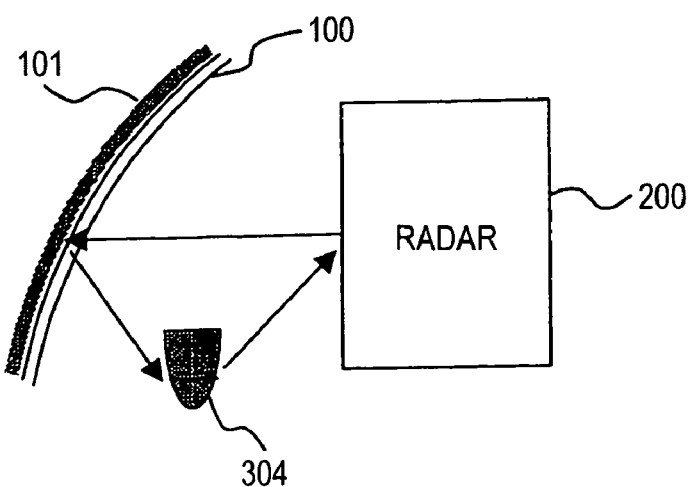
FIG. 25 is an explanatory view showing an example with a different guiding unit according to Embodiment 1.

Moreover, for example, a dielectric lens 304 may be used to refract the reflected wave from the dirt 101 adhering to the surface of the vehicle-side radome so that the reflected wave can be received by the receiving antenna, as shown in FIG. 25.

Similarly, if the reflected wave from the dirt adhering to the surface of the vehicle-side radome is refracted into the direction of the receiving antenna, parallel to the directivity direction of the receiving antenna, the reflected wave can be received more efficiently.

Figure 26:
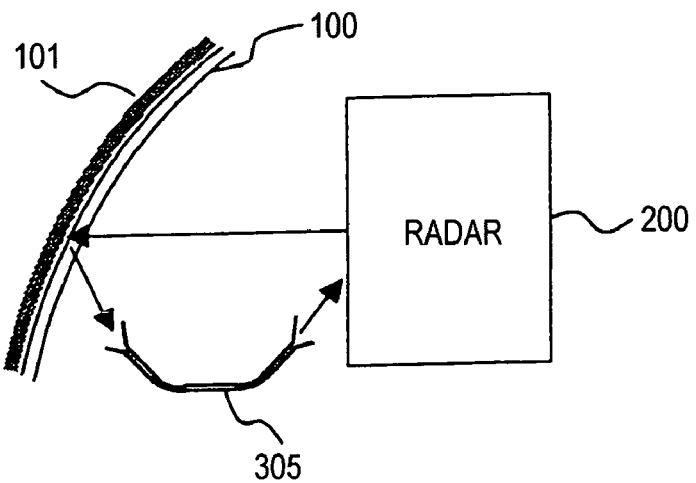
FIG. 26 is an explanatory view showing an example with a different guiding unit according to Embodiment 1.

Furthermore, a waveguide 305 may be used to guide the reflected wave from the dirt 101 adhering to the surface of the vehicle-side radome so that the reflected wave can be received by the receiving antenna, as shown in FIG. 26.

In this case, since the propagation loss is reduced, the reflected wave from the dirt can be received more efficiently.

Similarly, a dielectric wavequide may be used so that the reflected wave from the dirt adhering to the surface of the vehicle-side radome can be received by the receiving antenna.

Embodiment 2

Figure 11:
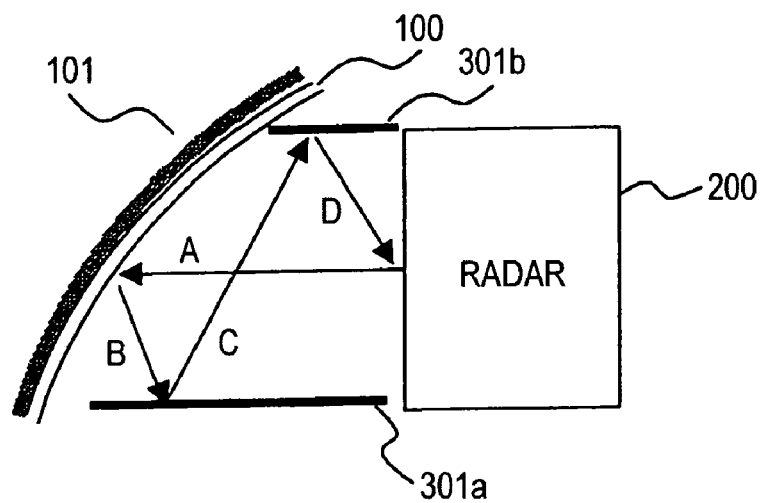
FIG. 11 is a schematic structural view showing a automotive radar device according to Embodiment 2.

FIG. 11 is a schematic structural view showing a automotive radar device according to Embodiment 2. The structure of the radar 200 in Embodiment 2 is the same as the structure shown in FIG. 2. Hereinafter, only the different parts from Embodiment 1 will be described.

Figure 12:
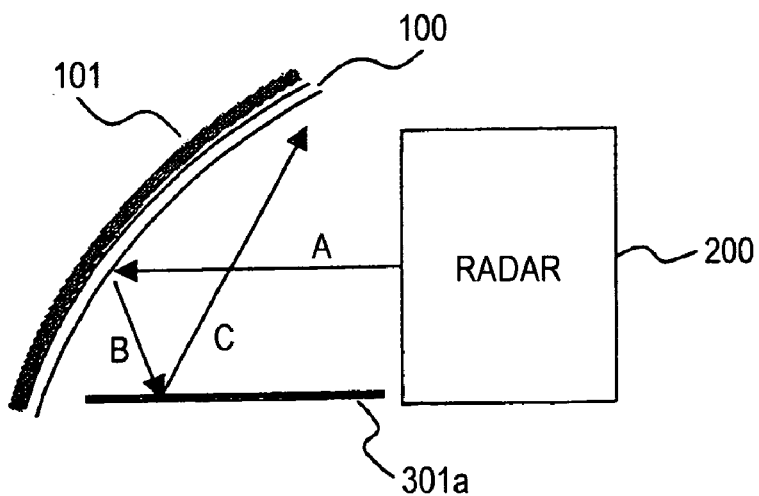
FIG. 12 is a view for explaining a dirt detection method according to Embodiment 2.

In Embodiment 1, the reflection board 300 in FIG. 1A is arranged as a guiding unit so that the reflected wave from the dirt 101 adhering to the surface of the vehicle-side radome can be received by the receiving antenna. However, the position where the reflection board is arranged is decided by the inclination of the vehicle-side radome and its distance from the radar. For example, in the case as shown in FIG. 12, the reflected wave from the dirt 101 is caused to travel through a path C by the reflection board 301a and therefore it is not received by the receiving antenna.

A technique of presetting the angle of arrangement of the reflection board so as to guide the reflected wave to the receiving antenna may be considered. However, if the positional relation between the vehicle-side radome and the radar is changed by mild shock, again, the reflected wave is not received by the receiving antenna.

To solve this problem, in Embodiment 2, guiding units are provided that are arranged to face each other with the transmission wave traveling between them so that the reflected wave from the adhering matter on the surface of the vehicle-side radome can be received by the receiving antenna.

Specifically, reflection boards 301a, 301b are arranged at lower and upper positions between the vehicle-side radome 100 and the radar 200, as shown in FIG. 11.

In this case, the reflected wave from the dirt 101 is caused to travel through the path C by the reflection board 301a, but it is reflected again by the reflection board 301b arranged at the upper position and thus travels through a path D to be received by the receiving antenna of the radar 200.

Thus, when the dirt 101 is adhering to the vehicle-side radome 100, the reflected wave from the surface with the dirt is reflected by the reflection boards 301a, 301b arranged at the lower and upper positions, and is ultimately inputted to the receiving antenna. When no dirt is on the vehicle-side radome 100, the transmission wave is emitted, passing through the vehicle-side radome 100. Therefore, there is little reflection from the vehicle-side radome 100.

Figure 13:
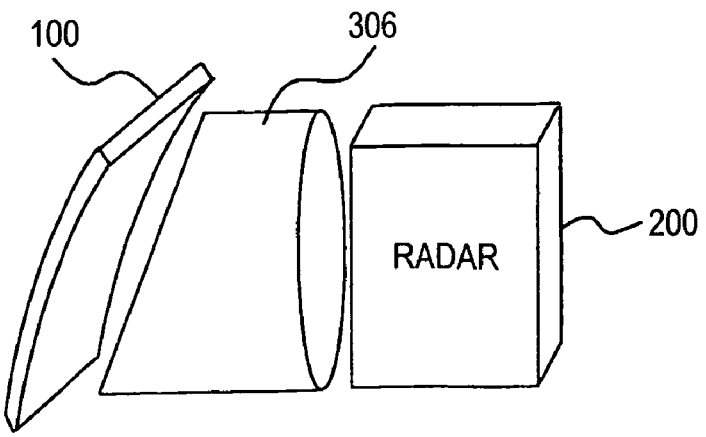
FIG. 13 is an explanatory view showing an example with a different guiding unit according to Embodiment 2.

In this embodiment, the reflection boards 301a, 301b are arranged at the lower and upper positions. However, a cylindrical reflecting unit 306 may be provided to similarly guide the reflected wave from the dirt 101 on the vehicle-side radome 100 to the receiving antenna, as shown in FIG. 13.

Next, dirt detection processing performed by the signal processing unit 213 of the radar 200 will be described. This dirt detection processing functions as an adhering matter judging unit that judges the existence/non-existence of adhering matter on the surface of the vehicle-side radome on the basis of the signal level of the reflected wave.

Figure 14:
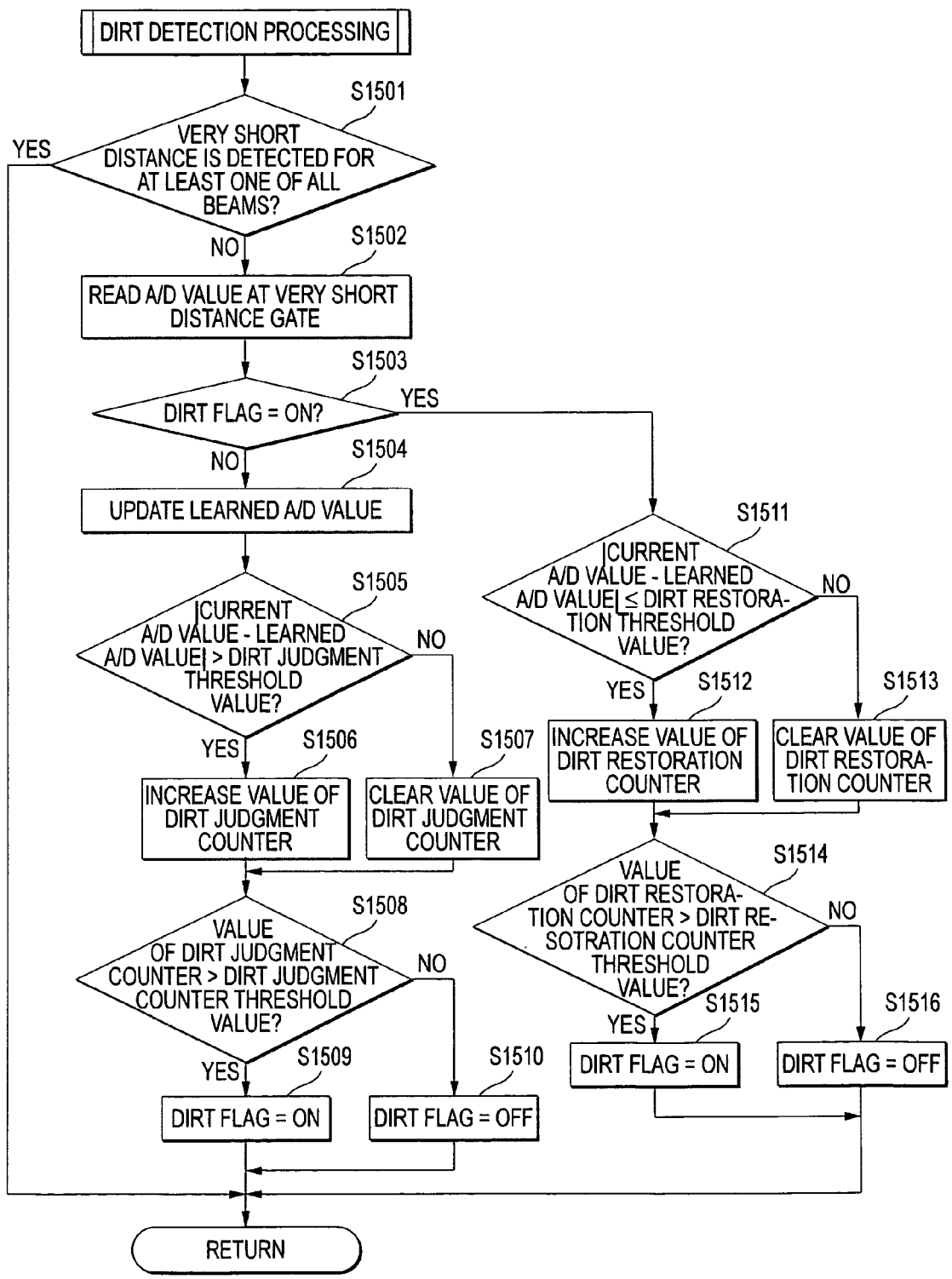
FIG. 14 is a flowchart of dirt detection processing according to Embodiment 2.

The flowchart of signal processing is similar to FIG. 9. Here, the dirt detection processing is described. FIG. 14 shows a flowchart of dirt detection processing. Each step will now be described.

S1501: It is checked whether a very short distance (for example, 10 m or less) is detected, with respect to all the beams. If the very short distance is detected for at least one beam, the processing ends. If the very short distance is detected for none of the beams, the processing shifts to S1502.

If an object is actually detected at the very short distance, the A/D value of the very short distance gate changes depending on the relative velocity and misjudgment of dirt may occur. Therefore, in the very short distance detection state, dirt judgment is not performed.

S1502: The A/D value at the very short distance gate (for example, minimum distance gate) is read.

S1503: If a dirt flag is ON, the processing shifts to S1511. If it is OFF, the processing shifts to S1504.

S1504: The learned A/D value is updated. For example, a moving average value is calculated by using the past A/D values.

S1505: The absolute value X of the difference between the currently inputted A/D value and the learned A/D value is calculated and compared with a preset dirt judgment threshold value. If X is larger than the dirt judgment threshold value, the processing shifts to S1506. Otherwise, the processing shifts to S1507.

S1506: The value of a dirt judgment counter is increased.
S1507: The value of the dirt judgment counter is cleared.
S1508: If the value of the dirt judgment counter is larger than a preset dirt judgment counter threshold value, the processing shifts to S1509. Otherwise, the processing shifts to S1510.
S1509: The dirt flag is turned ON.
S1510: The dirt flag is turned OFF.
S1511: The absolute value X of the difference between the currently inputted A/D value and the learned A/D value is calculated and compared with a preset dirt restoration threshold value. If X is equal to or less than the dirt restoration threshold value, the processing shifts to S1512. Otherwise, the processing shifts to S1513.
S1512: The value of a dirt restoration counter is increased.
S1513: The value of the dirt restoration counter is cleared.
S1514: If the value of the dirt restoration counter is larger than a preset dirt restoration counter threshold value, the processing shifts to S1515. Otherwise, the processing shifts to S1516.
S1515: The dirt flag is turned OFF.
S1516: The dirt flag is turned ON.

In this manner, according to this embodiment, the dirt 101 adhering to the surface of the vehicle-side radome can be securely detected irrespective of the positional relation between the vehicle-side radome 100 and the radar 200.

Also, since the dirt adherence judgment is made on the basis of the learned value of reflection level, misjudgment can be prevented even if the reflection level in the absence of dirt adherence changes because of temperature changes and changes with the lapse of time.

Moreover, the dirt adherence judgment is performed if the value of the dirt detection counter is larger than the predetermined value, that is, if change in the reflection level continues for a predetermined period of time. Therefore, even when raindrops adhere to the surface of the vehicle-side radome in rainy weather and the reflection level changes instantaneously, misjudgment due to such change can be prevented.

Embodiment 3

Figure 15:
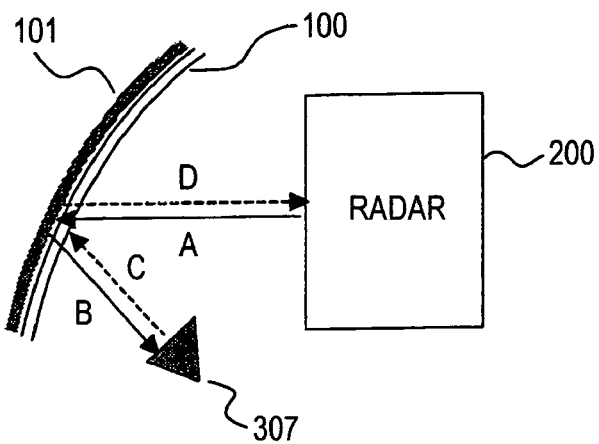
FIG. 15 is a schematic structural view showing a automotive radar device according to Embodiment 3.

FIG. 15 is a schematic structural view showing a automotive radar device according to Embodiment 3.

In Embodiment 1, the reflection board 300 is used so that the reflected wave from the dirt adhering to the surface of the vehicle-side radome can be received by the receiving antenna. In this embodiment, however, a corner reflector 307 is arranged to reflect the reflected wave from the adhering matter on the surface of the vehicle-side radome to its incoming direction, as shown in FIG. 15.

The transmission wave from the radar 200 passes through a path A, is then reflected by the dirt 101 adhering to the surface of the vehicle-side radome, passes through a path B, and is reflected into a path C by the corner reflector 307. Moreover, the reflected wave is reflected again by the dirt 101 adhering to the surface of the vehicle-side radome, then passes through a path D and is received by the receiving antenna of the radar 200.

Thus, when the dirt 101 is adhering to the vehicle-side radome 100, the reflected wave from the surface with the dirt is reflected by the corner reflector 307 and is ultimately inputted to the receiving antenna. When there is no dirt on the vehicle-side radome 100, the transmission wave is emitted, passing through the vehicle-side radome 100. Therefore, there is little reflection from the vehicle-side radome 100.

Figure 16:
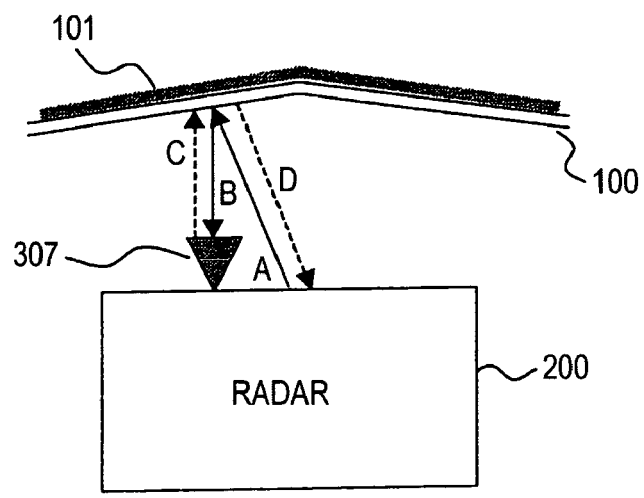
FIG. 16 is a view for explaining a dirt detection method according to Embodiment 3.

FIG. 16 shows the position where the corner reflector 307 is installed (as it faces upward). In this example, for example, the left end beam (#0) shown in FIG. 5 is transmitted, passes through a path A, is then reflected by the dirt 101 adhering to the surface of the vehicle-side radome, passes through a path B, and is reflected by the corner reflector 307 into a path C directed toward the vehicle-side radome. Moreover, the reflected wave is reflected again by the dirt 101 adhering to the surface of the vehicle-side radome, passes through a path D and is received by the receiving antenna.

Figure 17:
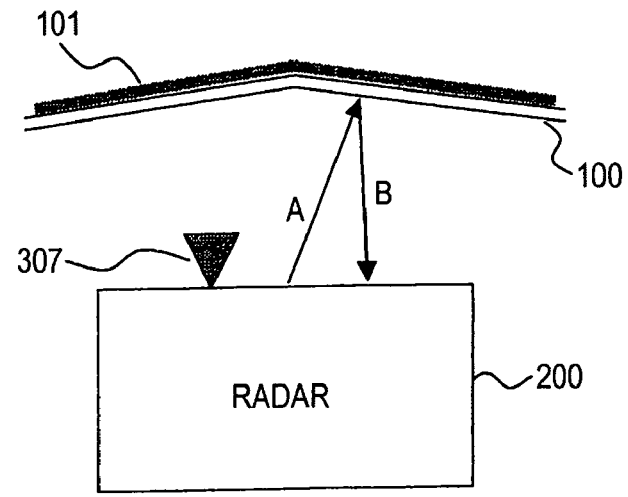
FIG. 17 is a view for explaining the dirt detection method according to Embodiment 3.

On the other hand, for example, the right end beam (#7) shown in FIG. 5 passes through a path A, is then reflected by the dirt 101 adhering to the surface of the vehicle-side radome, passes through a path B and is reflected toward the radar, as shown in FIG. 17. However, since the corner reflector 307 does not exist in this direction, the reflected wave is not received by the receiving antenna.

Therefore, if the left end beam (#0) and the right end beam (#7) are considered, both beams have substantially the same A/D value at the distance gate equivalent to a very short distance when no dirt is on the surface of the vehicle-side radome. However, when the dirt is on the surface of the vehicle-side radome, only the A/D value for the left end beam (#0) changes because of the influence of the arranged corner reflector and the difference from the A/D value for the right end beam (#7) increases.

Thus, the A/D values at the distance gate equivalent to the very short distance for the left end beam (#0) and the right end beam (#7) can be monitored to judge the adherence of dirt when the difference in the A/D value reaches a predetermined level or higher.

Figure 18:
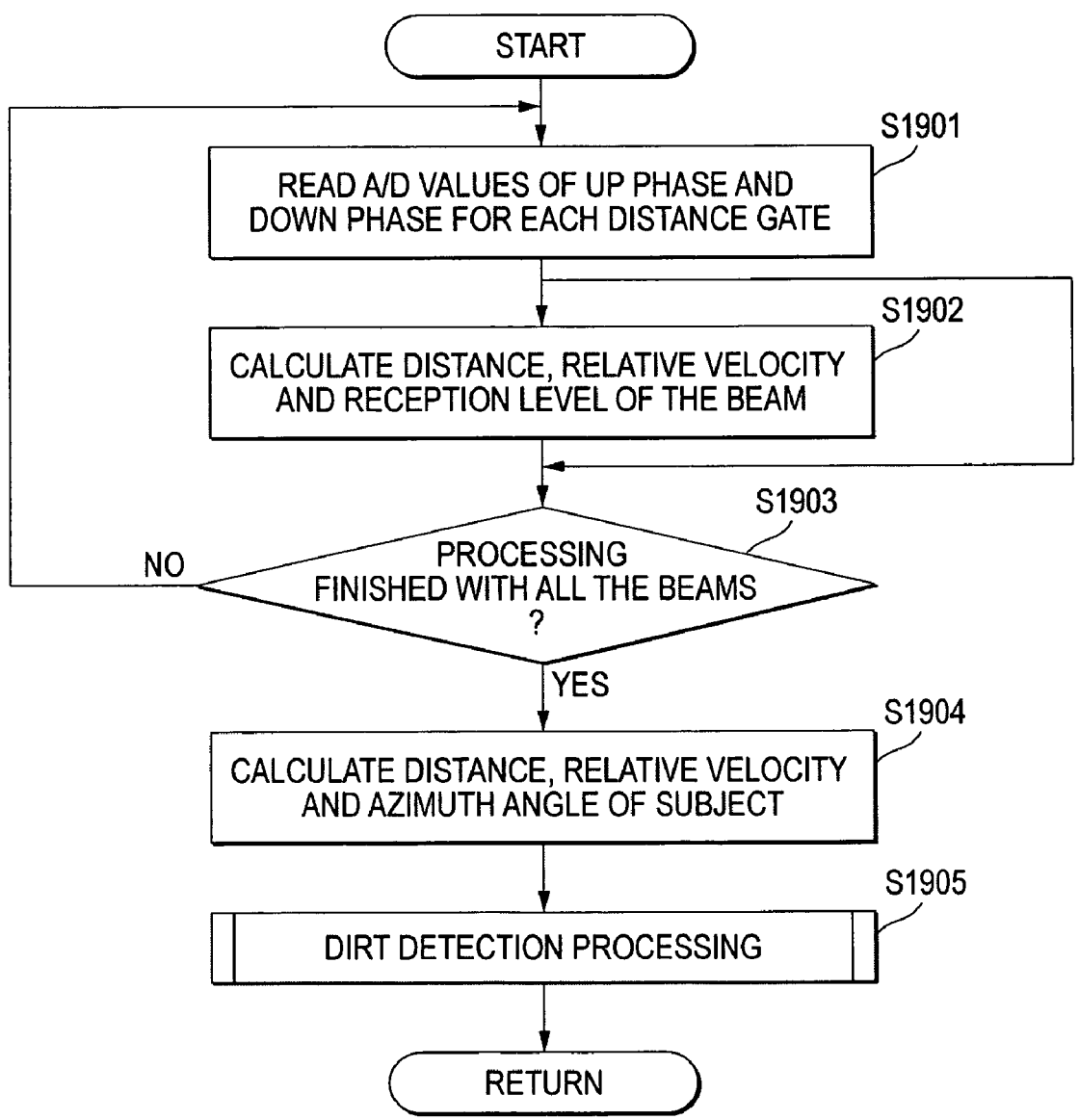
FIG. 18 is a flowchart of signal processing according to Embodiment 3.

Next, signal processing performed by the signal processing unit 213 of the radar 200 is shown in the flowchart of FIG. 18. Each step will now be described.

S1901: The A/D values of up phase and down phase are read for each distance gate.
S1902: The distance, relative velocity and reception level of the beam are calculated on the basis of the read A/D values.
S1903: It is judged whether the processing is finished with all the beams or not. If it is finished, the processing shifts to S1904. If not, the processing goes back to S1901.
S1904: The distance, relative velocity and azimuth angle of a subject are calculated from the distance, relative velocity and reception level of each beam.
S1905: Dirt detection processing is executed.

Figure 19:
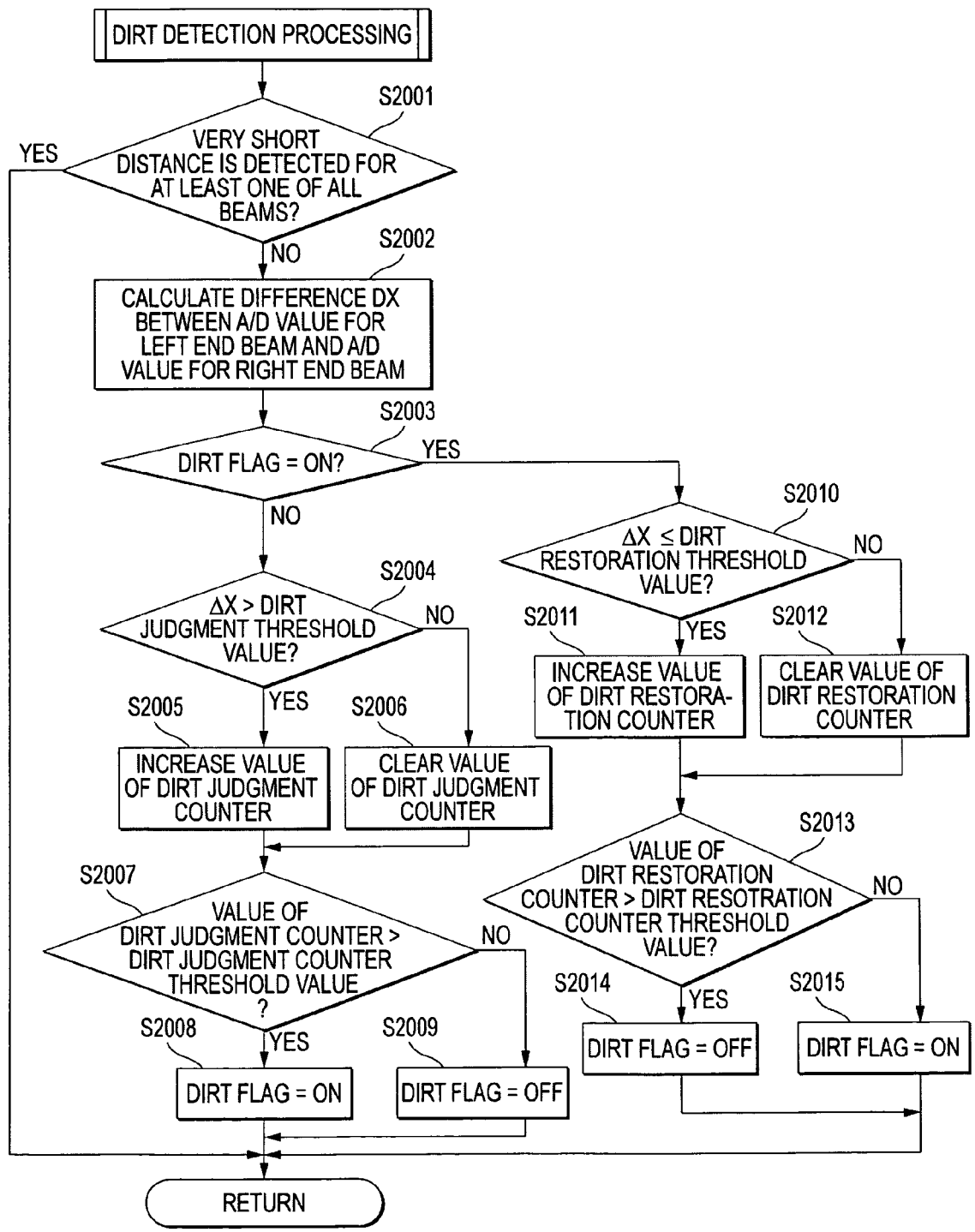
FIG. 19 is a flowchart of dirt detection processing according to Embodiment 3.

Next, the dirt detection processing will be described. FIG. 19 shows a flowchart of the dirt detection processing. This dirt detection processing functions as an adhering matter judging unit that judges the existence/non-existence of adhering matter on the surface of the vehicle-side radome on the basis of the signal level of the reflected wave.

Each step will now be described.

S2001: It is checked whether a very short distance (for example, 10 m or less) is detected, with respect to all the beams. If the very short distance is detected for at least one beam, the processing ends. If the very short distance is detected for none of the beams, the processing shifts to S2002.

If an object is actually detected at the very short distance, the A/D value of the very short distance gate changes depending on the relative velocity and misjudgment of dirt may occur. Therefore, in the very short distance detection state, dirt judgment is not performed.

S2002: The difference (ΔX) between the A/D value at the very short distance for the left end beam and the A/D value at the very short distance for the right end beam is calculated.

S2003: If a dirt flag is ON, the processing shifts to S2010. If it is OFF, the processing shifts to S2004.

S2004: The difference ΔX calculated at S2002 is compared with a dirt judgment threshold value. If ΔX is larger than the dirt judgment threshold value, the processing shifts to S2005. Otherwise, the processing shifts to S2006.

S2005: The value of a dirt judgment counter is increased.

S2006: The value of the dirt judgment counter is cleared.

S2007: If the value of the dirt judgment counter is larger than a preset dirt judgment counter threshold value, the processing shifts to S2008. Otherwise, the processing shifts to S2009.

S2008: The dirt flag is turned ON.

S2009: The dirt flag is turned OFF.

S2010: The difference ΔX calculated at S2002 is compared with a dirt restoration threshold value. If ΔX is equal to or less than the dirt restoration threshold value, the processing shifts to S2011. Otherwise, the processing shifts to S2012.

S2011: The value of a dirt restoration counter is increased.

S2012: The value of the dirt restoration counter is cleared.

S2013: If the value of the dirt restoration counter is larger than a preset dirt restoration counter threshold value, the processing shifts to S2014. Otherwise, the processing shifts to S2015.

S2014: The dirt flag is turned OFF.

S2015: The dirt flag is turned ON.

In this manner, according to this embodiment, the corner reflector 307 is arranged between the vehicle-side radome 100 and the radar 200 so that the reflected wave from the dirt adhering to the surface of the vehicle-side radome can be reflected to its incoming direction and ultimately received by the receiving antenna. Thus, the dirt adhering to the surface of the vehicle-side radome can be securely detected.

The ratio of the reflection level in the case where the dirt 101 is on the vehicle-side radome 100 to the reflection level in the state where no dirt is on the vehicle-side radome 100 is larger in Embodiment 3 than in Embodiment 1, where the reflected wave from the dirt is reflected toward the receiving antenna.

For example, if the reflection coefficient on the surface of the vehicle-side radome with no dirt is 0.1 and the reflection coefficient on the surface of the vehicle-side radome with dirt is 0.5, the ratio of the reflection level in the case where dirt exists to the reflection level in the case where there is no dirt when reflecting the reflected wave toward the receiving antenna as in Embodiment 1 is $$0.5/0.1=5$$

whereas the ratio of the reflection level in the case where dirt exists to the reflection level in the case where there is no dirt when reflecting the reflected wave into its incoming direction by the corner reflector 307 as in Embodiment 3 is $$0.5^2/0.1^2=25$$

because the reflected wave is reflected twice on the surface of the vehicle-side radome. Thus, the ratio is five times larger than in Embodiment 1. Therefore, the dirt can be detected more securely.

Moreover, the guiding unit, that reflects the reflected wave from the adhering matter on the surface of the vehicle-side radome so that the reflected wave only in a specific beam direction can be received by the receiving antenna, is arranged between the vehicle-side-radome 100 and the radar 200, and the existence/non-existence of the adhering matter on the surface of the vehicle-side radome is judged on the basis of the reflection level from the adhering matter on the surface of the vehicle-side radome in the specific beam direction and in the other beam directions. Therefore, it is not necessary to make each adjustment such as providing a judgment reference value map in consideration of the temperature characteristics, and increase in the adjustment cost does not occur. Moreover, changes with the lapse of time of the reflection characteristics of the adhering matter on the surface of the vehicle-side radome can be addressed.

Also, even if dirt already exists at the time of starting the engine, the dirt can be detected, which cannot be detected by the technique of learning the level of the reflected components as described in Embodiment 2.

In addition to the above-described advantages, misjudgment due to level changes (caused by noise or the like) in the case where no dirt adherence exists can be prevented by providing a preset threshold value for dirt adherence judgment.

Also, in addition to the above-described advantages, since the dirt adherence judgment is made if the change in the reflection level continues for a predetermined period of time, misjudgment due to instantaneous changes in the reflection level caused by adherence of raindrops on the surface of the vehicle-side radome in rainy weather can be prevented.

Figure 20:
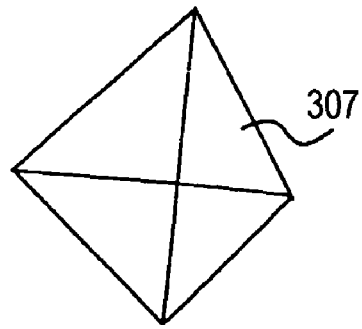
FIG. 20 is a schematic view showing a corner reflector used in Embodiment 3.

In Embodiment 3, corner reflector 307 as shown in FIG. 20 is used so that the reflected wave from the dirt adhering to the surface of the vehicle-side radome is reflected to its incoming direction and can be ultimately received by the receiving antenna.

The corner reflector 307 is formed by perpendicularly combining three right isosceles triangles and has a property of reflecting incoming radio waves to the same direction. This property facilitates adjustment for arranging the guiding unit. Plural corner reflectors 307 may be used.

A guiding unit of any form may be used as long as it similarly reflects the reflected wave from the dirt adhering to the surface of the vehicle-side radome so that the reflected wave can be ultimately received by the receiving antenna.

Figure 27:
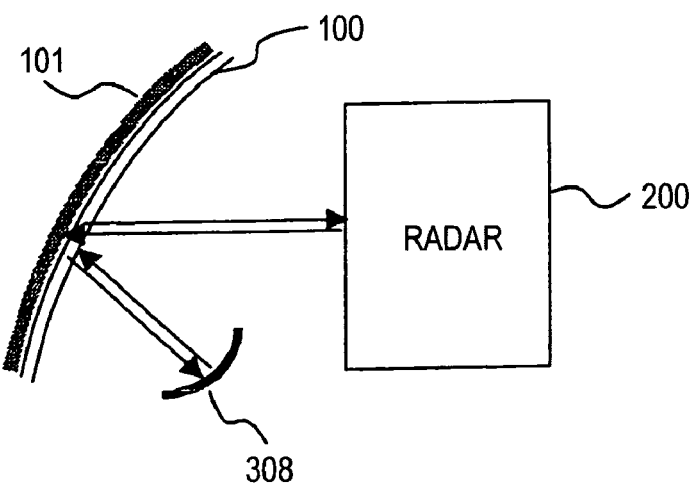
FIG. 27 is an explanatory view showing an example with a different guiding unit according to Embodiment 3.

For example, a reflecting mirror 308 may be used as a guiding unit that reflected the reflected wave from the dirt 101 adhering to the surface of the vehicle-side radome into its incoming direction so that the reflected wave can be received by the receiving antenna, as shown FIG. 27.

Figure 28:
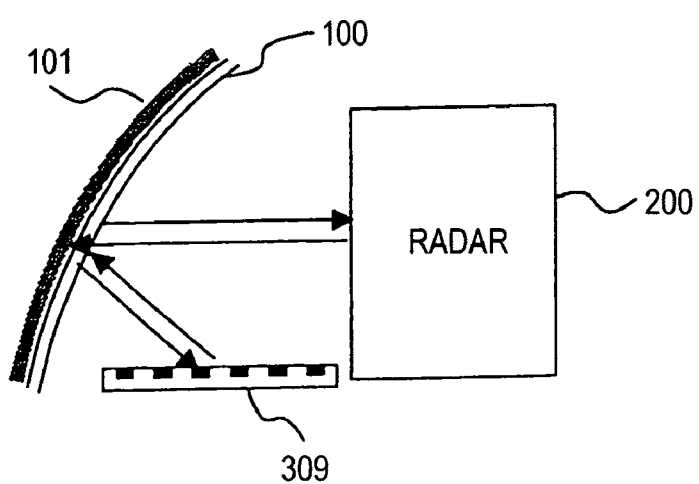
FIG. 28 is an explanatory view showing an example with a different guiding unit according to Embodiment 3.

Also, for example, a flat array antenna 309 having total reflection at its feeding point may be used, as shown in FIG. 28.

In this case, the reflected wave from the dirt 101 adhering to the surface of the vehicle-side radome can be reflected to its incoming direction by making phase adjustment of each element of the array antenna 309 in advance. This enables provision of a thinner guiding unit, and increase in the degree of freedom and easiness in the arrangement.

Moreover, this can prevent shielding over the front part of the radar.

If the feeding point of the flat array antenna 309 is switched between total reflection and terminal (for example, 50Ω) by a switch, it is possible in transmitting plural beams to perform total reflection only when transmitting a specific beam. Thus, it is possible to receive the reflected wave from the dirt 101 adhering to the surface of the vehicle-side radome, with respect only to the specific beam direction.

Figure 29:
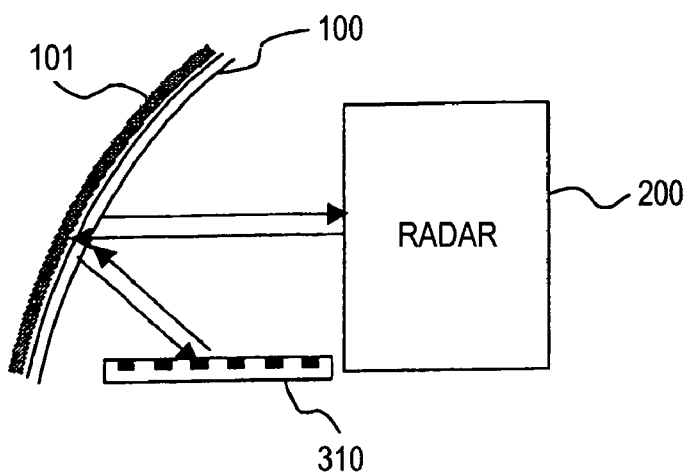
FIG. 29 is an explanatory view showing an example with a different guiding unit according to Embodiment 3.

Also, for example, a reflector array 310 may be used, as shown in FIG. 29.

This enables provision of a thinner guiding unit, and increase in the degree of freedom and easiness in the arrangement.

Moreover, this can prevent shielding over the front part of the radar 200.

A guiding unit that enables the reflected wave from the dirt adhering to the surface of the vehicle-side radome to be received by the receiving antenna may be integrally constructed with the vehicle-side radome.

Figure 30:
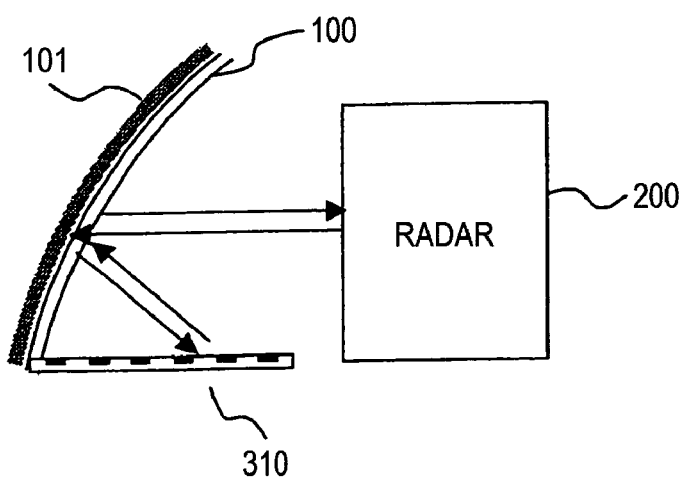
FIG. 30 is an explanatory view showing an example with a different guiding unit according to Embodiment 3.

For example, the vehicle-side radome 100 and the reflector array 310 are integrally constructed, as shown in FIG. 30.

Thus, the position where the guiding unit is arranged need not be adjusted.

Also, a guiding unit that enables the reflected wave from the dirt adhering to the surface of the vehicle radome to be received by the receiving antenna may be integrally constructed with the radar.

Figure 31:
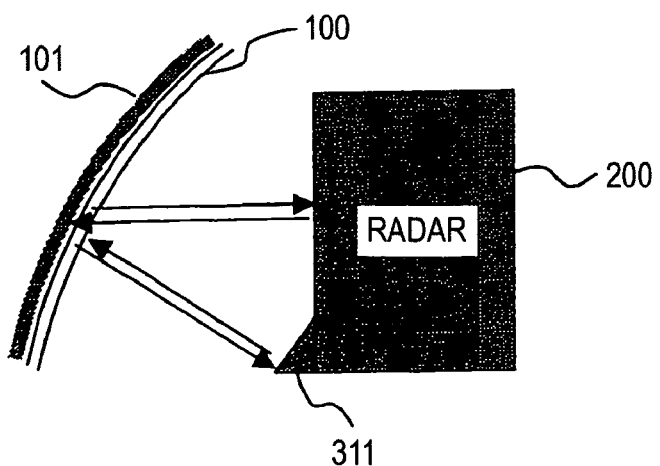
FIG. 31 is an explanatory view showing an example with a different guiding unit according to Embodiment 3.

For example, the radar 200 and a reflector 311 are integrally constructed, as shown in FIG. 31.

Thus, the position where the guiding unit is arranged need not be adjusted.

Moreover, a guiding unit that enables the reflected wave from the dirt adhering to the surface of the vehicle radome to be received by the receiving antenna may be integrally constructed with the vehicle-side radome and the radar.

Figure 32:
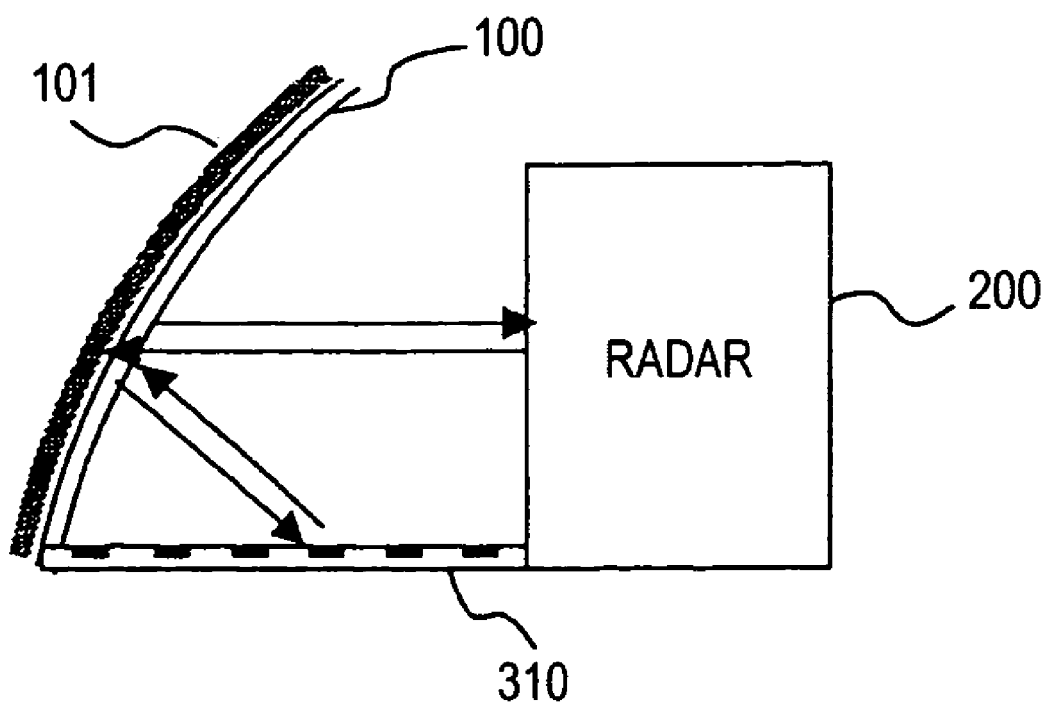
FIG. 32 is an explanatory view showing an example with a different guiding unit according to Embodiment 3.

For example, the vehicle-side radome 100, the radar 200 and the reflector array 310 are integrally constructed, as shown in FIG. 32.

Thus, the position where the guiding unit is arranged need not be adjusted.

In Embodiment 3 (FIG. 20) a left end beam (FIG. 5) is used as a specific beam direction and a right end beam is used as the other beam direction. However, other beams may also be used if they meet the requirement of reflecting the reflected wave from the dirt adhering to the surface of the vehicle-side radome into its incoming direction with respect to only one of these beams.

What is claimed is:

1. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
    a guiding unit that is arranged between the vehicle-side radome and the radar and that guides a reflected wave, without modulation thereof, from adhering matter on a surface of the vehicle-side radome to the receiving unit of the radar; and
    an adhering matter judging unit that judges the existence/non-existence of the adhering matter on the surface of the vehicle-side radome on the basis of the signal level of the reflected wave received by the receiving unit,
    wherein the guiding unit guides a reflected wave reflected in only a specific beam direction to the receiving unit, and
    wherein the adhering matter judging unit judges the existence/non-existence of adhering matter on the surface of the vehicle-side radome on the basis of the signal level of the reflected wave in the specific beam direction and in another beam direction.

2. The automotive radar device as claimed in claim 1, wherein the adhering matter judging unit determines that adhering matter exists on the surface of the vehicle-side radome if absolute value of difference in the signal level of the reflected wave between the specific beam direction and the other beam direction is equal to or larger than a predetermined value.

3. The automotive radar device as claimed in claim 1, wherein the adhering matter judging unit determines that adhering matter exists on the surface of the vehicle-side radome if a state where the absolute value of the difference in the signal level of the reflected wave between the specific beam direction and the other beam direction is equal to or larger than a predetermined value continues for a predetermined period of time.

4. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
    a guiding unit that is arranged between the vehicle-side radome and the radar and that guides a reflected wave, without modulation thereof, from adhering matter on a surface of the vehicle-side radome to the receiving unit of the radar; and
    an adhering matter judging unit that judges the existence/non-existence of the adhering matter on the surface of the vehicle-side radome on the basis of the signal level of the reflected wave received by the receiving unit,
    wherein the guiding unit reflects the reflected wave from the adhering matter on the surface of the vehicle-side radome in a direction toward the receiving unit.

5. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
    a guiding unit that is arranged between the vehicle-side radome and the radar and that guides a reflected wave, without modulation thereof, from adhering matter on a surface of the vehicle-side radome to the receiving unit of the radar; and
    an adhering matter judging unit that judges the existence/non-existence of the adhering matter on the surface of the vehicle-side radome on the basis of the signal level of the reflected wave received by the receiving unit,
    wherein the guiding unit reflects the reflected wave from the adhering matter on the surface of the vehicle-side radome to a direction where the receiving unit exists so that the reflected wave becomes parallel to a directivity direction of a receiving antenna.

6. The automotive radar device as claimed in claim 4, wherein the guiding unit is a reflecting mirror.

7. The automotive radar device as claimed in claim 4, wherein the guiding unit is a flat array antenna having total reflection at its feeding point.

8. The automotive radar device as claimed in claim 4, wherein the guiding unit is a flat array antenna in which a feeding point can be switched between total reflection and terminal by a switch.

9. The automotive radar device as claimed in claim 4, wherein the guiding unit is a reflector array.

10. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
- a guiding unit that is arranged between the vehicle-side radome and the radar and that guides a reflected wave, without modulation thereof, from adhering matter on a surface of the vehicle-side radome to the receiving unit of the radar; and
- an adhering matter judging unit that judges the existence/non-existence of the adhering matter on the surface of the vehicle-side radome on the basis of the signal level of the reflected wave received by the receiving unit,
- wherein the guiding unit refracts the reflected wave from the adhering matter on the surface of the vehicle-side radome into a direction where the receiving unit exists.

11. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
- a guiding unit that is arranged between the vehicle-side radome and the radar and that guides a reflected wave, without modulation thereof, from adhering matter on a surface of the vehicle-side radome to the receiving unit of the radar; and
- an adhering matter judging unit that judges the existence/non-existence of the adhering matter on the surface of the vehicle-side radome on the basis of the signal level of the reflected wave received by the receiving unit,
- wherein the guiding unit refracts the reflected wave from the adhering matter on the surface of the vehicle-side radome into a direction where the receiving unit exists so that the reflected wave becomes parallel to a directivity direction of a receiving antenna.

12. The automotive radar device as claimed in claim 10, wherein the guiding unit is a dielectric lens.

13. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
- a guiding unit that is arranged between the vehicle-side radome and the radar and that guides a reflected wave, without modulation thereof, from adhering matter on a surface of the vehicle-side radome to the receiving unit of the radar; and
- an adhering matter judging unit that judges the existence/non-existence of the adhering matter on the surface of the vehicle-side radome on the basis of the signal level of the reflected wave received by the receiving unit,
- wherein the guiding unit reflects the reflected wave from the adhering matter on the surface of the vehicle-side radome to its incoming direction.

14. The automotive radar device as claimed in claim 13, wherein the guiding unit is a reflecting mirror.

15. The automotive radar device as claimed in claim 13, wherein the guiding unit is a single corner reflector or plural corner reflectors.

16. The automotive radar device as claimed in claim 13, wherein the guiding unit is a flat array antenna having total reflection at its feeding point.

17. The automotive radar device as claimed in claim 13, wherein the guiding unit is a flat array antenna in which a feeding point can be switched between total reflection and terminal by a switch.

18. The automotive radar device as claimed in claim 13, wherein the guiding unit is a reflector array.

19. An automotive radar device having a radio-type radar housed in a vehicle-side radome installed on a vehicle, the radio-type radar including a transmitting unit and a receiving unit, the automotive radar device sending and receiving radio waves from the radar through the vehicle-side radome, in a sending and receiving direction, and measuring distance and relative velocity with respect to a subject, the automotive radar device comprising:
- a guiding unit that is arranged between the vehicle-side radome and the radar and that guides a reflected wave, without modulation thereof, from adhering matter on a surface of the vehicle-side radome to the receiving unit of the radar; and
- an adhering matter judging unit that judges the existence/non-existence of the adhering matter on the surface of the vehicle-side radome on the basis of the signal level of the reflected wave received by the receiving unit,
- wherein the reflected wave is reflected from said surface along a path which is different from the path of incidence of the wave on said surface.

* * * * *